US008272489B2

(12) United States Patent
Gokan et al.

(10) Patent No.: US 8,272,489 B2
(45) Date of Patent: Sep. 25, 2012

(54) MULTIPLE DISC CLUTCH

(75) Inventors: Yoshitsugu Gokan, Wako (JP); Hirotaka Kawatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 477 days.

(21) Appl. No.: 12/566,306

(22) Filed: Sep. 24, 2009

(65) Prior Publication Data

US 2010/0078285 A1   Apr. 1, 2010

(30) Foreign Application Priority Data

Sep. 30, 2008  (JP) ................. 2008-255101

(51) Int. Cl.
*F16D 43/21* (2006.01)
*F16D 13/52* (2006.01)

(52) U.S. Cl. ............... 192/70.23; 192/54.5; 192/89.21; 192/96; 192/110 B

(58) Field of Classification Search ............ 192/54.5, 192/56.6, 70.23, 89.21, 96
See application file for complete search history.

(56) References Cited

U.S. PATENT DOCUMENTS

| 4,585,105 A * | 4/1986 | Iio et al. ............. 192/96 |
| 8,025,138 B2 * | 9/2011 | Yoshinaga et al. ............ 192/54.5 |
| 2008/0029332 A1 * | 2/2008 | Gokan et al. ............ 192/70.23 |
| 2009/0127057 A1 * | 5/2009 | Inomori et al. ............ 192/70.18 |
| 2010/0078286 A1 * | 4/2010 | Gokan et al. ............ 192/70.23 |

FOREIGN PATENT DOCUMENTS

JP   59-212533 A   12/1984

* cited by examiner

*Primary Examiner* — Richard M. Lorence
(74) *Attorney, Agent, or Firm* — Westerman, Hattori, Daniels & Adrian, LLP

(57) ABSTRACT

A multiple disc clutch includes a pressing member movable in an axial direction and which turns together with an output shaft to compress driving friction plates and driven friction plates, a clutch spring that axially presses the pressing member, a clutch lifter arranged coaxially with the pressing member and a lifter plate that is held by the periphery of the clutch lifter via a clutch bearing. The lifter plate moves the pressing member in a reverse direction to a direction pressed by the clutch spring according to the axial movement of the clutch lifter. This multiple disc clutch does not require a dedicated clutch lifter for every clutch bearing different in size and therefore the cost is reduced.

9 Claims, 5 Drawing Sheets

MULTIPLE DISC CLUTCH

TECHNICAL FIELD

The present invention relates to a multiple disc clutch provided with a clutch outer coupled to an input member, plural driving friction plates fitted to the clutch outer relatively unturnably, plural driven friction plates arranged alternately with the driving friction plates, a pressing member axially movable and turned together with the output shaft so as to compress the driving friction plates and the driven friction plates, a clutch spring that axially presses the pressing member, a clutch lifter that can be moved in a reverse direction to a direction in which the pressing member is pressed by the clutch spring and that is arranged coaxially with the pressing member, and a lifter plate that is held by the periphery of the clutch lifter via a clutch bearing and that moves the pressing member in the reverse direction to the direction in which the pressing member is pressed by the clutch spring according to the axial movement of the clutch lifter.

BACKGROUND OF THE INVENTION

A multiple disc clutch in which a clutch lifter is integrally provided with a shank and a flange overhanging outside in a radial direction from an intermediate part of the shank is already disclosed in JP-A No. S59-212533.

SUMMARY OF THE INVENTION

In the multiple disc clutch disclosed in JP-A No. S59-212533, since the shank and the flange are integrated together as the clutch lifter, a shape of the flange changes depending upon the size of a clutch bearing, and thus a dedicated clutch lifter is required for every clutch bearing different in size, and the cost is increased.

The present invention provides a multiple disc clutch where it is not required to prepare a dedicated clutch lifter for every clutch bearing different in size and the cost is reduced.

A first aspect of the present invention is based upon a multiple disc clutch provided with a clutch outer coupled to an input member, a plurality of driving friction plates fitted to the clutch outer relatively unturnably, a plurality of driven friction plates arranged alternately with the driving friction plates, a pressing member movable in an axial direction and turned together with an output shaft so as to compress the driving friction plates and the driven friction plates, a clutch spring that presses the pressing member in the axial direction, a clutch lifter that can be moved in a reverse direction of a direction in which the pressing member is pressed by the clutch spring and that is arranged coaxially with the pressing member, and a lifter plate that is held by the periphery of the clutch lifter via a clutch bearing and that moves the pressing member in the reverse direction of the direction pressed by the clutch spring according to axial movement of the clutch lifter. The multiple disc clutch has a characteristic that the clutch lifter includes a lifter pin which is coaxial with the pressing member and a dished holding member formed as a separate member from the lifter pin and attached to an intermediate part of the lifter pin.

A second aspect of the present invention is based upon the configuration of the first aspect of the present invention and has a characteristic that the clutch spring is arranged inside the clutch bearing provided between the holding member and the lifter plate in the axial direction and outside a nut screwed to the output shaft so as to fix an inner member turned together with the pressing member to the output shaft.

A third aspect of the present invention is based upon the configuration of the present invention according to the first or second aspect and has a characteristic that a dislocation preventing member touched and fitted to the periphery of the lifter plate on the side of the lifter plate opposite the clutch spring is installed on the pressing member.

A fourth aspect of the present invention is based upon the configuration of the present invention according to any of the first to third aspects and has a characteristic that the clutch spring is arranged inside in a radial direction of the pressing member, and that the lifter plate and the holding member are arranged outside the clutch spring in the direction along an axis of the output shaft.

Further, a fifth aspect of the present invention is based upon the configuration of the present invention according to the second aspect and has a characteristic that the clutch bearing is arranged outside the nut with a part of the clutch bearing overlapping with the nut in a side view.

A main shaft in an embodiment corresponds to the output shaft in the present invention, a primary driven gear in the embodiment corresponds to the input member in the present invention, a clutch inner in the embodiment corresponds to the pressing member in the present invention, a center cam in the embodiment corresponds to the inner member in the present invention, and a snap ring in the embodiment corresponds to the dislocation preventing member in the present invention.

According to the first aspect of the present invention, since the clutch lifter is configured by the lifter pin and the dished holding member formed as a separate member from the lifter pin and attached to the intermediate part of the lifter pin, only a shape of the holding member has to be changed when the size of the clutch bearing is changed, with the lifter pin being unchanged, and the cost of the clutch lifter can be productively reduced.

According to the second aspect of the present invention, since the clutch spring is arranged inside the clutch bearing in the axial direction and outside the nut screwed to the output shaft so as to fix the inner member turned together with the pressing member to the output shaft, the clutch spring is arranged effectively utilizing the space around the nut and the multiple disc clutch can be miniaturized.

According to the third aspect of the present invention, since the dislocation preventing member installed on the pressing member is touched and fitted to the periphery of the lifter plate in the direction pressed by the clutch spring, the pressing member and the lifter plate can be easily assembled even though they are separate members, and the axial movement of the lifter plate can be transmitted to the pressing member with a simple structure.

According to the fourth aspect of the present invention, since the clutch spring is arranged inside in the radial direction of the pressing member and the lifter plate and the holding member are arranged outside the clutch spring in the direction along the axis of the output shaft, the clutch spring can be covered and protected by the pressing member, the lifter plate and the holding member. Also, oil is prevented from being splashed on the clutch spring, and a drag of the clutch spring can be prevented from being caused.

Further, according to the fifth aspect of the present invention, since the clutch bearing is arranged outside the nut with a part of the clutch bearing overlapped with the nut in the side view, it can contribute to the axial compactness of the multiple disc clutch.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
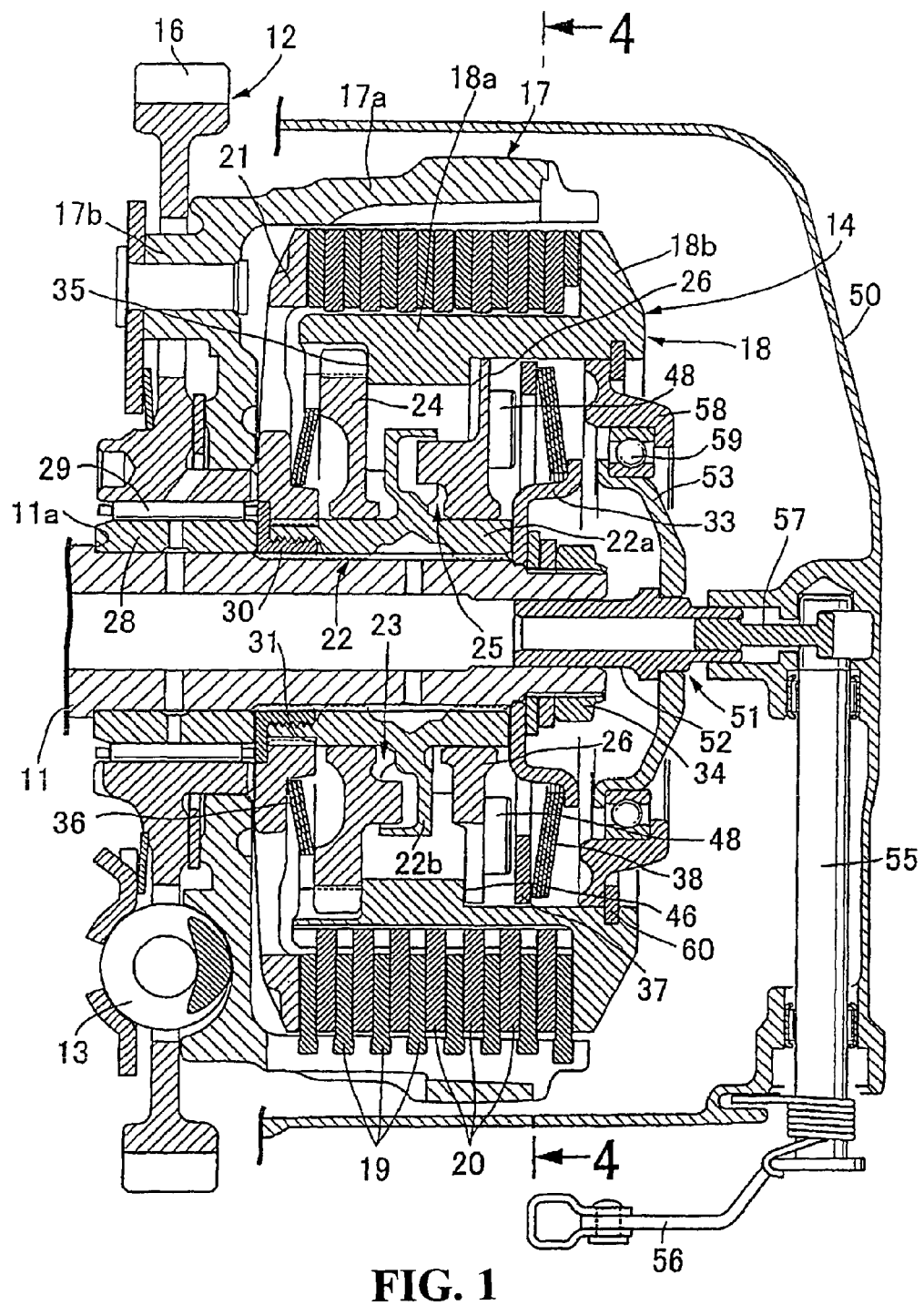
FIG. 1 is a sectional view showing a multiple disc clutch.

First, referring to FIG. 1, a primary reduction gear 12, a damping spring 13 and a multiple disc clutch 14 are provided between a crankshaft (not shown) of an engine mounted in a motorcycle for example and a main shaft 11 of a gear shift unit (not shown), the primary reduction gear 12 is configured by a primary driving gear (not shown) provided to the crankshaft and a primary driven gear 16 engaged with the primary driving gear, and the primary driven gear 16 is relatively turnably supported by the main shaft 11.

The multiple disc clutch 14 is provided with a clutch outer 17 coupled to the primary driven gear 16 as an input member via the damping spring 13, a clutch inner 18 as a pressing member having a cylindrical part 18a coaxially arranged inside the clutch outer 17 and a pressurizing plate part 18b integrated with one end of the cylindrical part 18a, plural driving friction plates 19 fitted to the clutch outer 17 so that the driving friction plates cannot be relatively turned, plural driven friction plates 20 arranged alternately with the driving friction plates 19 and fitted to the cylindrical part 18a of the clutch inner 18 so that the driven friction plates cannot be relatively turned, a pressure plate 21 fixed to the main shaft 11 as an output shaft with the alternately overlapped driving friction plates 19 and the driven friction plates 20 sandwiched between the pressure plate and the pressurizing plate part 18b, a center cam 22 having a disc part 22b arranged on a plane perpendicular to an axis of the main shaft 11, arranged inside in a radial direction of the cylindrical part 18a and fixed to the main shaft 11, an assist cam plate 24 opposite to one surface of the disc part 22b in a state in which the assist cam plate cannot be relatively turned with the clutch inner 18 and a slipper cam plate 26 fixed to the clutch inner 18 and opposite to the other surface of the disc part 22b.

The clutch outer 17 is integrally formed by a cylindrical part 17a coaxially enclosing the cylindrical part 18a of the clutch inner 18 and an end wall part 17b that connects with an end on the side of the primary driven gear 16 of the cylindrical part 17a, is formed in the shape of a bowl open on the reverse side to the primary driven gear 16, and peripheral parts of the plural driving friction plates 19 are fitted to the cylindrical part 17a so that the peripheral parts can be moved axially and cannot be relatively turned.

The clutch inner 18 is provided with the cylindrical part 18a and the pressurizing plate part 18b integrated, with the pressurizing plate part 18b overhanging outside in the radial direction.

An annular stage 11a opposite to the side of the multiple disc clutch 14 is formed on the periphery of the main shaft 11 in a part corresponding to the primary reduction gear 12, an end of a cylindrical sleeve 28 fitted to the periphery of the main shaft 11, on the reverse side to the multiple disc clutch 14 is touched to the annular stage 11a, and a needle bearing 29 is inserted between the periphery of the sleeve 28 and an inner circumference of the primary driven gear 16.

Figure 2:
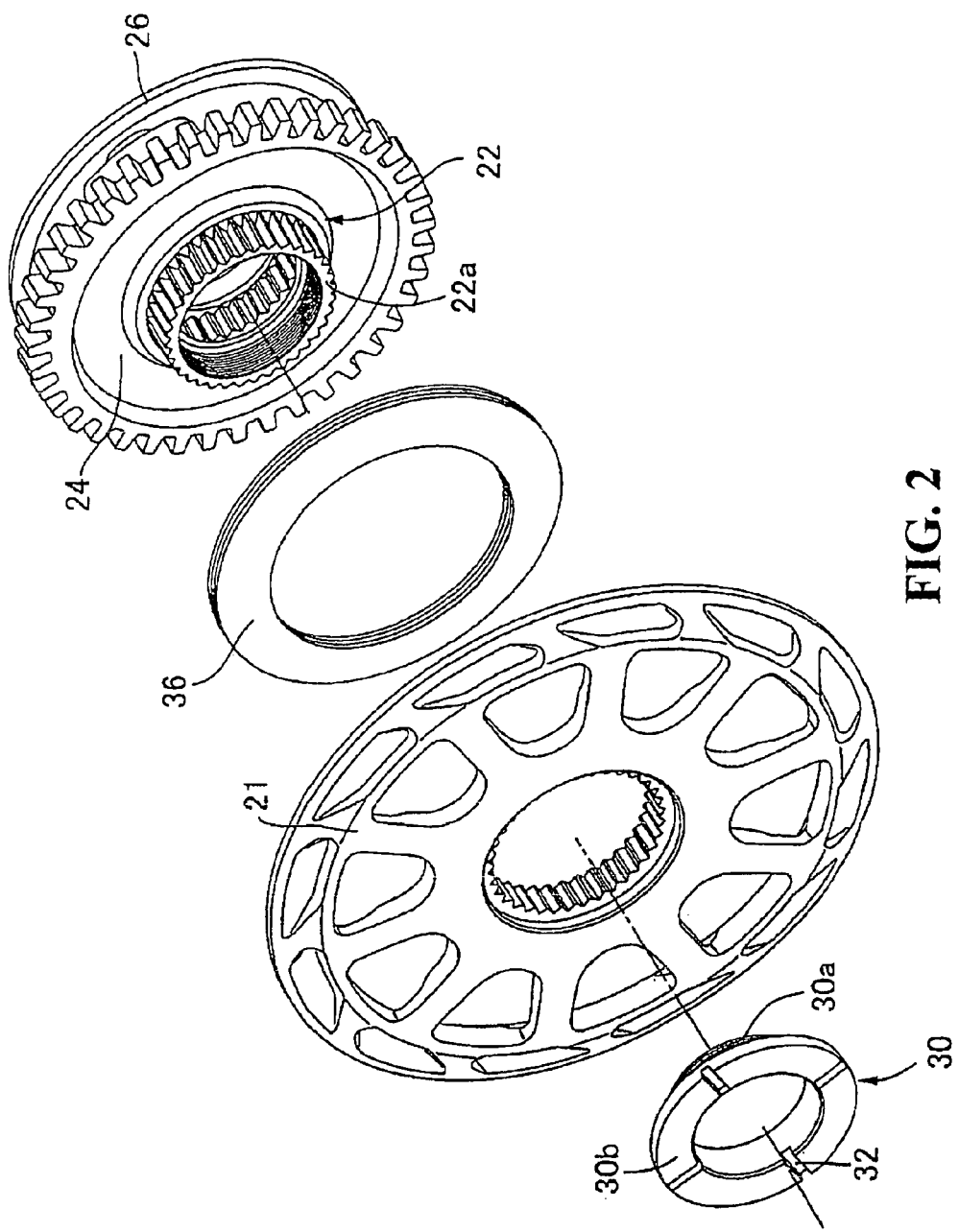
FIG. 2 is an exploded perspective view showing a center cam, an assist cam, a slipper cam, a coned disc spring, a pressure plate and a fixing holder.

Also referring to FIG. 2, the center cam 22 is integrally provided with a cylindrical boss 22a fitted to the periphery of the main shaft 11 via spines and the disc part 22b (see FIG. 1) overhanged outside in the radial direction from an intermediate part in an axial direction of the boss 22a and arranged on the plane perpendicular to an axial direction of the main shaft 11. In the meantime, the pressure plate 21 is formed in the shape of a disc and a fixing holder 30 that detachably fixes the pressure plate 21 to the periphery of the boss 22a is detachably attached to the boss 22a.

The fixing holder 30 is screwed to the boss 22a with a stage 31 provided to the periphery of the boss 22a between an inner circumference of the pressure plate 21 and the holder, and the inner circumference of the pressure plate 21 is fitted to the periphery of the boss 22a via splines.

The fixing holder 30 is integrally provided with a cylindrical threaded shank 30a screwed to an end on the side of the sleeve 28 of the boss 22a and a flange 30b overhanging outside the periphery of the boss 22a and connecting with an outer end of the threaded shank 30a, and the inner circumference of the pressure plate 21 is held between the stage 31 of the boss 22a and the flange 30b.

In addition, a cross-shaped fitting groove 32 for example for fitting a turning tool is provided to an outer end face of the fixing holder 30, an outer end face of the flange 30b in this embodiment.

As a nut 34 nipping an annular spring retainer 33 between the nut and one end of the boss 22a of the center cam 22 is screwed to one end of the main shaft 11, the flange 30b of the fixing holder 30, the boss 22a of the center cam 22 and the spring retainer 33 are held between the annular stage 11a and the nut 34 by tightening the nut 34 and the boss 22a is fitted to the periphery of the main shaft 11 via splines, the center cam 22 and the pressure plate 21 are fixed to the main shaft 11.

The assist cam plate 24 configures an assist cam mechanism 23 that moves the clutch inner 18 to the side on which the pressurizing plate part 18b is brought close to the pressure plate 21 according to an increase of driving force input from the primary driven gear 16 in collaboration with the center cam 22. In addition, the slipper cam plate 26 configures a back torque limiter mechanism 25 that moves the clutch inner 18 to the side on which the pressurizing plate part 18b is separated from the pressure plate 21 according to an increase of back torque from the main shaft 11 in collaboration with the center cam 22.

The periphery of the assist cam plate 24 supported movably in the axial direction by the boss 22a of the center cam 22 is fitted to the inner circumference of the cylindrical part 18a of the clutch inner 18 via splines and an annular regulating stage 35 that regulates the movement of the assist cam plate 24 to the side close to the disc part 22b is formed on the inner circumference of the cylindrical part 18a so that the regulating stage 35 can be touched to the periphery of the assist cam plate 24. The periphery of the slipper cam plate 26 holding the disc part 22b of the center cam 22 between the slipper cam plate 26 and the assist cam plate 24 is fixed to the cylindrical part 18a of the clutch inner 18.

A sub clutch spring 36 that presses the assist cam plate 24 on the side close to the disc part 22b of the center cam 22 is inserted between the assist cam plate 24 and the pressure plate 21 and is configured by piling plural coned disc springs, for example.

In the meantime, the slipper cam plate 26 is arranged between the disc part 22b of the center cam 22 and an annular set plate 37 fixed to the cylindrical part 18a of the clutch inner 18, and is fixed to the cylindrical part 18a while being supported movably in the axial direction by the cylindrical part 18a of the clutch inner 18, and a clutch spring 38 formed by piling plural coned disc springs is provided between the spring retainer 33 fixed to the main shaft 11 and the set plate 37. The clutch inner 18 is pressed on the side on which the pressurizing plate part 18b is brought close to the pressure plate 21, that is, on the side on which the driving friction plates 19 and the driven friction plates 20 are fitted and the multiple disc clutch 14 is connected by resilience produced by the clutch spring 38.

Figure 3:
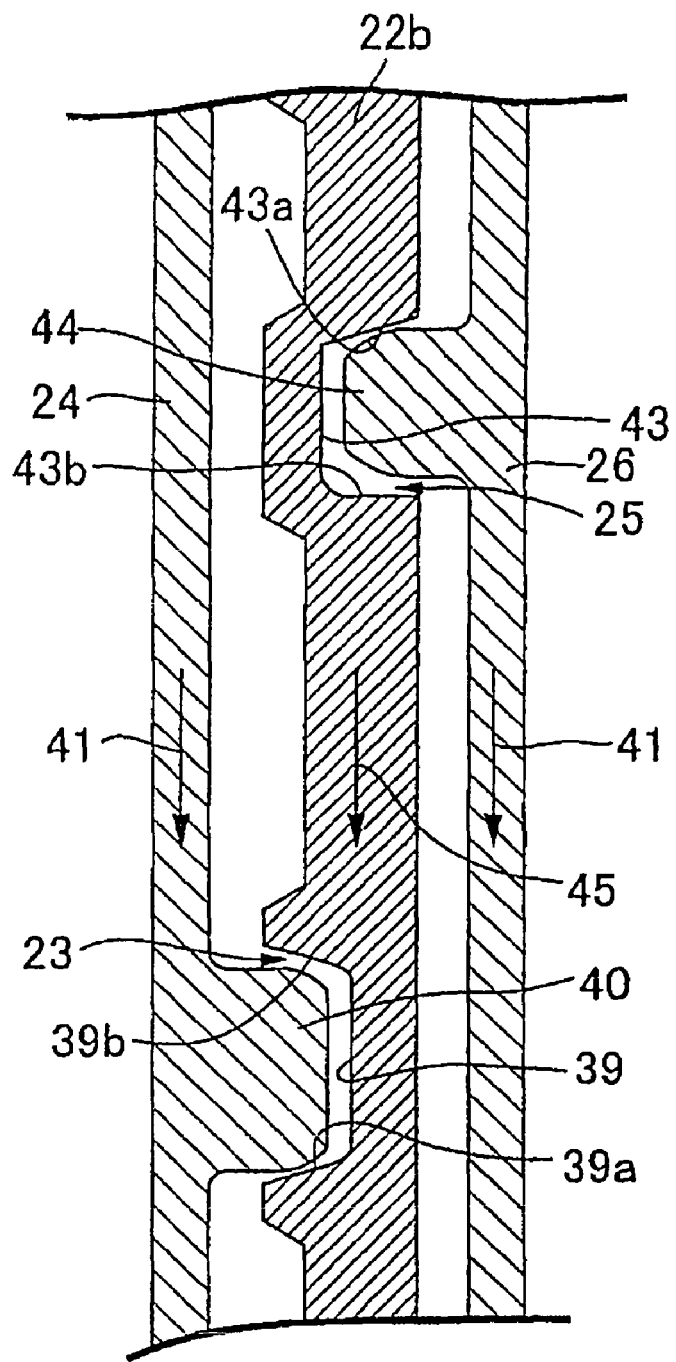
FIG. 3 is a development sectional view showing an assist cam mechanism and a back torque limiter mechanism respectively in a circumferential direction.

As shown in FIG. 3, in the assist cam mechanism 23, plural projections 40 protruded from the assist cam plate 24 are inserted into plural concave portions 39 provided on one surface of the disc part 22b of the center cam 22, when a rotational direction of the clutch inner 18 is a direction shown by an arrow 41 in FIG. 3 while motive power is transmitted from the primary driven gear 16 to the main shaft 11 via the multiple disc clutch 14 in a connected state, each first slanting contact face 39a slanting and located in front in a rotational direction 41 toward the side of the assist cam plate 24 is formed on a forward face in the rotational direction 41 of each concave portion 39 and each second slanting contact face 39b slanting and located behind in the rotational direction 41 toward the side of the assist cam plate 24 is formed on a backward face in the rotational direction 41 of each concave portion 39.

When torque fluctuation on the side of acceleration occurs while the torque is transmitted between the primary driven gear 16 and the main shaft 11, each projection 40 of the assist cam plate 24 is touched to the first slanting contact face 39a of each concave portion 39 of the disc part 22b of the center cam 22, force on the side separating from the disc part 22b of the center cam 22 acts on the assist cam plate 24 from the disc part 22b, pressure in a reverse direction by the sub clutch spring 33 that negates the pressure of the clutch spring 38 is damped, the pressure by the clutch spring 38 is completely enforced, and the compressive force of the driving friction plates 19 and the driven friction plates 20 is increased.

In the back torque limiter mechanism 25, plural projections 44 protruded from the slipper cam plate 26 are inserted into plural concave portions 43 provided to the other surface of the disc part 22b of the center cam 22, when torque fluctuation on the side of deceleration occurs while the multiple disc clutch 14 is connected, each third slanting contact face 43a slanting and located behind in a rotational direction 45 toward the side of the slipper cam plate 26 is formed on a backward face in the rotational direction 45 of each concave portion 43 when a rotational direction of the center cam 22 is the direction shown by an arrow 45, and each fourth slanting contact face 43b slanting and located in front in the rotational direction 45 toward the side of the slipper cam plate 26 is formed on a forward face in the rotational direction 45 of each concave portion 43.

When torque fluctuation on the side of deceleration occurs while the torque is transmitted between the primary driven gear 16 and the main shaft 11, the third slanting contact face 43a of each concave portion 43 of the disc part 22b of the center cam 22 is touched to each projection 44 of the slipper cam plate 26, force on the side separating from the disc part 22b of the center cam 22 acts on the slipper cam plate 26 from the disc part 22b, the pressure of the clutch spring 38 is damped, and the compressive force of the driving friction plates 19 and the driven friction plates 20, 20 is damped.

Figure 4:
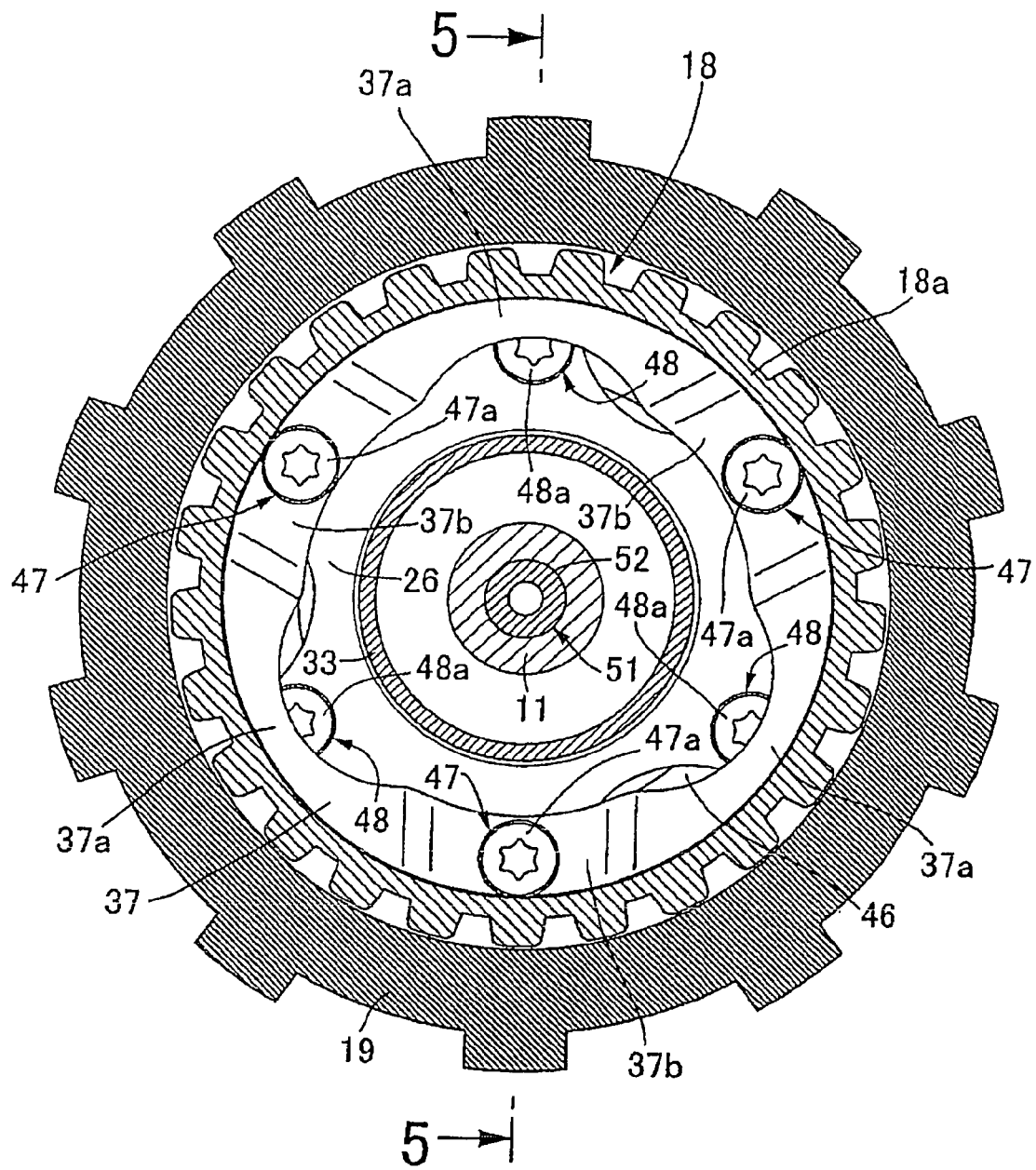
FIG. 4 is a sectional view viewed along a line 4-4 in FIG. 1.
Figure 5:
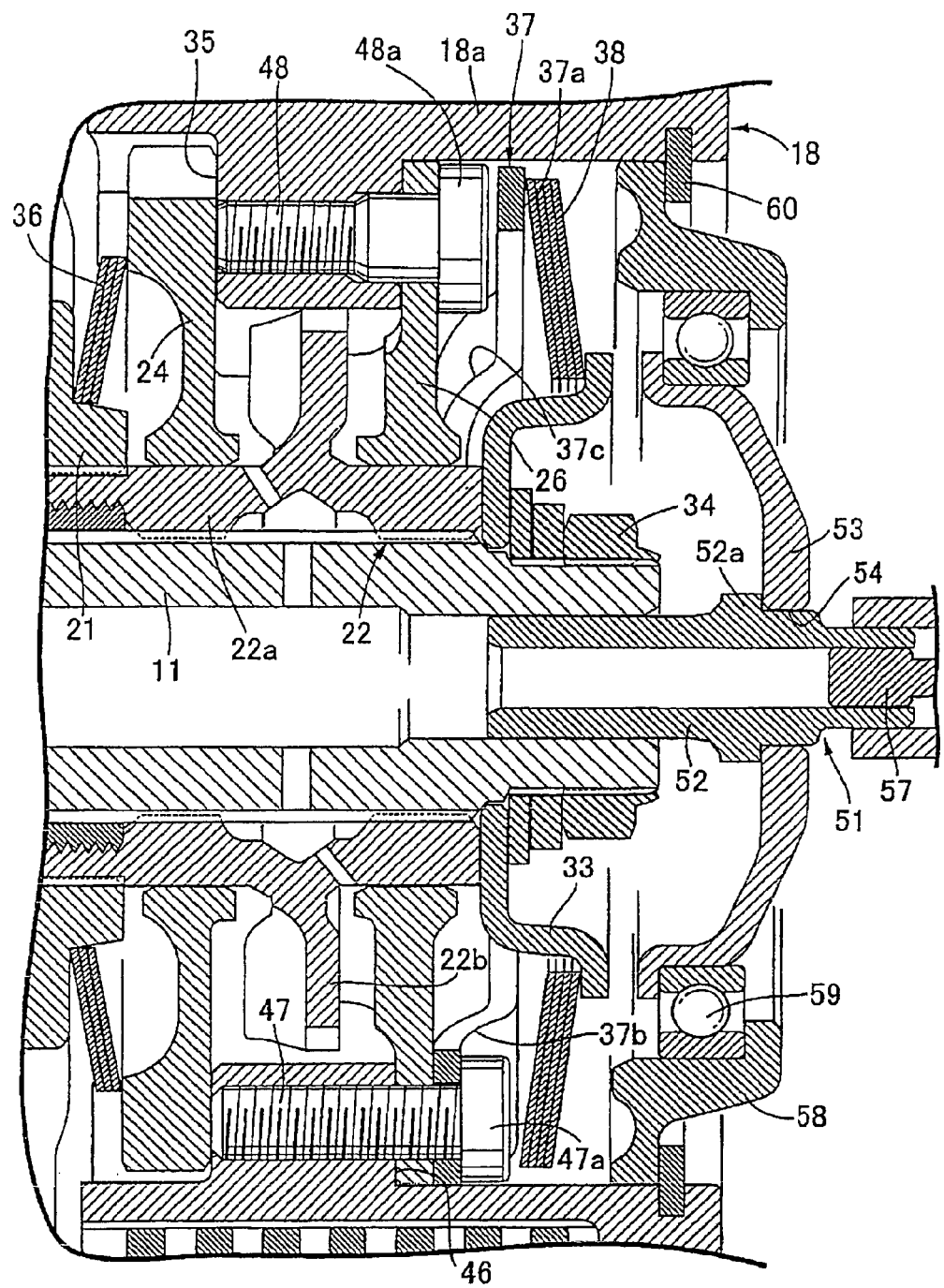
FIG. 5 is a sectional view viewed along a line 5-5 in FIG. 4.

Also referring to FIGS. 4 and 5, an annular mounting stage 46 opposite to the side of the slipper cam plate 26 on the reverse side to the regulating stage 35 is formed on the inner circumference of the cylindrical part 18a of the clutch inner 18 and the periphery of the slipper cam plate 26 is touched and fixed to the mounting stage 46. A part of the set plate 37 is touched to the slipper cam plate 26 in the axial direction and in this embodiment, the set plate 37 is formed so that plural locations at an interval in a peripheral direction of the set plate 37 are touched to the periphery of the slipper cam plate 26.

In addition, the set plate 37 is jointly fastened to the mounting stage 46 in the cylindrical part 18a of the clutch inner 18 together with the slipper cam plate 26 by plural bolts for joint fastening 47 and the slipper cam plate 26 is fastened to the mounting stage 46 by plural reamer bolts 48 in addition to the bolts for joint fastening 47.

The bolts for joint fastening 47 and the reamer bolts 48 are respectively three, the bolt for joint fastening 47 and the reamer bolt 48 are arranged at an equal interval or alternately at an interval in a circumferential direction of the clutch inner 18, and in this embodiment, the bolt for joint fastening 47 and the reamer bolt 48 are arranged at an equal interval in the circumferential direction.

Further, each reamer bolt 48 is arranged so that a part of each reamer bolt 48 is protruded inside in the radial direction from an inner circumference of the set plate 37 when each reamer bolt is viewed in an axial direction of the clutch inner 18 and each width narrow part 37a the width in the radial direction of the clutch inner 18 of which is smaller than a diameter of each extended head 47a of each bolt for joint fastening 47 is formed between the bolts for joint fastening 47 of the set plate 37.

The set plate 37 is formed apart from the slipper cam plate 26 to avoid interference with the reamer bolts 48 between parts in which the set plate is fastened by the bolts for joint fastening 47 though the set plate is touched to the periphery of the slipper cam plate 26 in the part of the set plate in which it is fastened by the bolts for joint fastening 47. Plural first housing concave portions 37b open on the reverse side to the slipper cam plate 26 and plural second housing concave portions 37c open on the side of the slipper cam plate 26 are provided to the set plate 37 with the first and second housing concave portions alternately arranged in a circumferential direction of the set plate and the set plate 37 is formed in a wavy state in the circumferential direction.

In addition, each extended head 47a of each bolt for joint fastening 47 is housed in each first housing concave portion 37b so that each extended head is not protruded on the side of the clutch spring 38 from the set plate 37 and each extended head 48a of each reamer bolt 48 is housed in each second housing concave portion 37c. Each width narrow part 37a forms a part of each second housing concave portion 37c.

The multiple disc clutch 14 is covered with an engine cover 50, with which the engine is provided. A clutch lifter 51 arranged coaxially with the clutch inner 18 is supported movably in the axial direction by the main shaft 11 and the engine cover 50 so that the clutch lifter 51 can be moved in a reverse direction to a direction in which the clutch inner 18 is pressed by the clutch spring 38.

The clutch lifter 51 is configured by a lifter pin 52 which is coaxial with the clutch inner 18 and a dished holding member 53 formed as a separate member from the lifter pin 52 and attached to an intermediate part of the lifter pin 52.

One end of the lifter pin 52 is slidably fitted to the engine cover 50 and the other end of the lifter pin 52 is slidably fitted to the main shaft 11. In addition, a mounting flange 52a overhanged outside in a radial direction is provided to the intermediate part of the lifter pin 52. In the meantime, an insertion hole 54 into which the lifter pin 52 is inserted is provided to the center of the holding member 53. The holding member 53 is attached to the lifter pin 52 by touching and fitting a circumferential edge of the insertion hole 54 to the mounting flange 52a from the outside in the axial direction.

An operating shaft 55 for switching the engagement/the disengagement of the multiple disc clutch 14 is turnably supported by the engine cover 50 and a lever 56 is provided to an end protruded from the engine cover 50 of the operating shaft 55. One end of a transmission shaft 57 displaced in the axial direction according to the turning of the operating shaft 55 is fitted to an inner end of the operating shaft 55 and the other end of the transmission shaft 57 is coaxially coupled to one end of the lifter pin 52 in the clutch lifter 51.

An annular lifter plate 58 that moves the clutch inner 18 in the reverse direction to the direction pressed by the clutch spring 38 according to the displacement in the axial direction of the clutch lifter 51 is held on the periphery of the clutch lifter 51, that is, on the periphery of the holding member 53 via a clutch bearing 59.

In addition, a snap ring 60 touched and fitted to the periphery of the lifter plate 58 on the side of the lifter plate opposite the clutch spring 38 is installed on an inner circumference of one end of the cylindrical part 18a in the clutch inner 18.

The clutch spring 38 is arranged inside the clutch bearing 59 in the axial direction and outside the nut 34 inside in the radial direction of the clutch inner 18, and the lifter plate 58 and the holding member 53 are arranged outside the clutch spring 38 in the axial direction of the main shaft 11.

Further, the clutch bearing 59 is arranged outside the nut 34 with a part of the clutch bearing overlapped with the nut 34 in a side view.

Next, to explain the action of this embodiment, the sub clutch spring 36 is provided among the clutch inner 18, the pressure plate 21 fixed to the main shaft 11 and the assist cam plate 24 touched to the regulating stage 35 of the clutch inner 18, as the fixing holder 30 that detachably fixes the pressure plate 21 to the periphery of the cylindrical boss 22a with which the center cam 22 fixed to the main shaft 11 is provided is detachably attached to the boss 22a, the center cam 22 and the pressure plate 21 can be prevented from being separated by the resilience of the sub clutch spring 36 in maintenance, the center cam 22 and the pressure plate 21 can be sub-assembled into a simple structure, and the ease of handling, the maintainability and the ease of assembly can be enhanced.

Since the fixing holder 30 is screwed to the boss 22a with the fixing holder holding the pressure plate 21 between the fixing holder 30 and the boss 22a, these members can be disassembled if necessary and the maintainability can be enhanced. In addition, the fitting groove 32 for fitting a turning tool is provided to the outer end face of the fixing holder 30, the fixing holder 30 can be axially compact without an operating part for turning the fixing holder 30 axially protruding. Thereby, the multiple disc clutch 14 can be axially compacted.

Since the pressure plate 21 is fitted to the periphery of the boss 22a via the splines, the displacement of the pressure plate 21 according to the turning of the main shaft 11 and the center cam 22 can be securely prevented.

Further, the fixing holder 30 is integrally provided with the threaded shank 30a screwed to the boss 22a and the flange 30b overhanged out of the periphery of the boss 22a. The fixing holder is linked to the outer end of the threaded shank 30a, and the pressure plate 21 is held between the stage 31 provided to the periphery of the boss 22a and the flange 30b. Thus, the center cam 22 and the pressure plate 21 can be disassembled if necessary and the maintainability can be enhanced.

The clutch inner 18 is axially pressed by the clutch spring 38. The lifter plate 58 that moves the clutch inner 18 in the reverse direction to the direction in which the clutch inner is pressed by the clutch spring 38 according to the axial movement of the clutch lifter 51 is held via clutch bearing 59 by the periphery of the clutch lifter 51 that can be moved in the reverse direction to the direction in which the clutch inner 18 is pressed by the clutch spring 38 and that is arranged coaxially with the clutch inner 18. The clutch lifter 51 is configured by the lifter pin 52 which is coaxial with the clutch inner 18 and the dished holding member 53 formed as a separate member from the lifter pin 52 and attached to the intermediate part of the lifter pin 52.

Therefore, since only a shape of the holding member 53 has to be changed when the size of the clutch bearing 59 is changed with the lifter pin 52 being unchanged, the cost of the clutch lifter 51 can be productively reduced.

In addition, since the clutch spring 38 is located inside the clutch bearing 59 provided between the holding member 53 and the lifter plate 58 in the axial direction, and is arranged outside the nut 34 screwed to the main shaft 11 to fix the center cam 22 turned together with the clutch inner 18 to the main shaft 11, the clutch spring 38 is arranged effectively utilizing space around the nut 34 and the multiple disc clutch 14 can be miniaturized.

The snap ring 60 is touched and fitted to the periphery of the lifter plate 58 in the direction pressed by the clutch spring 38 and is installed on the inner circumference at one end of the cylindrical part 18a in the clutch inner 18. Thus, simple assembly is enabled due to the snap ring being a separate member from the clutch inner 18 and the lifter plate 58, and the axial movement of the lifter plate 58 can be transmitted to the clutch inner 18 with a simple structure.

Since the clutch spring 38 is arranged inside the clutch inner 18 in the radial direction, and since the lifter plate 58 and the holding member 53 are arranged outside the clutch spring 38 in the axial direction of the main shaft 11, the clutch spring 38 can be covered and protected by the clutch inner 18, the lifter plate 58 and the holding member 53. Oil is prevented from being splashed on the clutch spring 38 and a drag of the clutch spring 38 can be prevented.

Since the clutch bearing 59 is arranged outside the nut 34 with a part of the clutch bearing overlapping with the nut 34 in a side view, it can contribute to the compactness in the axial direction of the multiple disc clutch 14.

Since a part of the ringed set plate 37 is provided on the side of the clutch inner 18 so as to receive a load by the clutch spring 38 that presses the clutch inner 18 in the axial direction. The part of the ringed set plate 37 is touched to the slipper cam plate 26 fixed to the clutch inner 18 in the axial direction so as to reduce frictional force for fitting the driving friction plates 19 and the driven friction plates 20. Thus, the area in which the set plate 37 is touched can be easily extended and strength for supporting the set plate 37 can be enhanced with a simple configuration in which the increase of the number of parts is avoided.

In addition, since the set plate 37 is jointly fastened to the clutch inner 18 together with the slipper cam plate 26 by the plural bolts for joint fastening 47, no dedicated bolt for fixing the set plate 37 is required and the set plate 37 can be securely fixed on the side of the clutch inner 18, avoiding the increase of the number of parts.

Since the slipper cam plate 26 is fastened to the clutch inner 18 by the plural reamer bolts 48 in addition to the plural bolts for joint fastening 47, the slipper cam plate 26 can be firmly fastened to the clutch inner 18 in parts fixed by the reamer bolts 48.

Since the slipper cam plate 26 is fastened to the clutch inner 18 by the three reamer bolts 48 in addition to the three bolts for joint fastening 47, the slipper cam plate 26 and the set plate 37 can be fixed to the clutch inner 18 with the minimum number of bolts. Since the bolts for joint fastening 47 and the reamer bolts 48 are arranged at an equal interval in the circumferential direction of the clutch inner 18, the slipper cam plate 26 and the set plate 37 can be fixed to the clutch inner 18 stably with uniform force in the circumferential direction.

Since a part of each reamer bolt 48 is protruded inside in the radial direction from the inner circumference of the set plate 37 when the part is viewed from the axial direction of the clutch inner 18, a situation in which each reamer bolt 48 is fastened can be easily checked in maintenance.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A multiple disc clutch, comprising:
    an input member;
    a clutch outer coupled to said input member;
    a plurality of driving friction plates fitted to said clutch outer;
    a plurality of driven friction plates disposed alternately with said plurality of driving friction plates;
    an output shaft;
    a pressing member movable in an axial direction to compress said plurality of driving friction plates and said plurality of driven friction plates, said pressing member turning together with said output shaft;
    a clutch spring axially pressing said pressing member;
    a clutch lifter movable in a reverse direction of a direction in which said pressing member is pressed by said clutch spring, said clutch lifter being disposed coaxially with said pressing member, said clutch lifter including,
        a lifter pin coaxial with said pressing member, and
        a dished holding member formed as a separate member from said lifter pin and attached to an intermediate part of said lifter pin; and
    a lifter plate held by a periphery of said clutch lifter via a clutch bearing, said lifter plate moving said pressing member in the reverse direction according to axial movement of said clutch lifter.

2. The multiple disc clutch according to claim 1, further comprising:
    an inner member turning together with said pressing member, and
    a nut screwed to said output shaft so as to fix said inner member to said output shaft,
    wherein said clutch bearing is provided between said dished holding member and said lifter plate in the axial direction, and
    wherein the clutch spring is arranged axially inside said clutch bearing and radially outside said nut.

3. The multiple disc clutch according to claim 2, further comprising a dislocation preventing member on said pressing member, said dislocation preventing member touching and fitted to a periphery of said lifter plate on a side of the lifter plate opposite said clutch spring.

4. The multiple disc clutch according to claim 3,
    wherein said clutch spring is disposed radially inside of said pressing member; and
    wherein said lifter plate and said holding member are disposed axially outside said clutch spring in a direction along an axis of said output shaft.

5. The multiple disc clutch according to claim 2,
    wherein said clutch spring is disposed radially inside of said pressing member; and
    wherein said lifter plate and said holding member are disposed axially outside said clutch spring in a direction along an axis of said output shaft.

6. The multiple disc clutch according to claim 2, wherein said clutch bearing is disposed radially outside said nut.

7. The multiple disc clutch according to claim 1, further comprising a dislocation preventing member on said pressing member, said dislocation preventing member touching and fitted to a periphery of said lifter plate on a side of the lifter plate opposite said clutch spring.

8. The multiple disc clutch according to claim 7,
    wherein said clutch spring is disposed radially inside of said pressing member; and
    wherein said lifter plate and said holding member are disposed axially outside said clutch spring in a direction along an axis of said output shaft.

9. The multiple disc clutch according to claim 1,
    wherein said clutch spring is disposed radially inside of said pressing member; and
    wherein said lifter plate and said holding member are disposed axially outside said clutch spring in a direction along an axis of said output shaft.

* * * * *